W. BROWN.
Improvement in Track-Sprinkler for Horse-Powers.
No. 132,797. Patented Nov. 5, 1872.
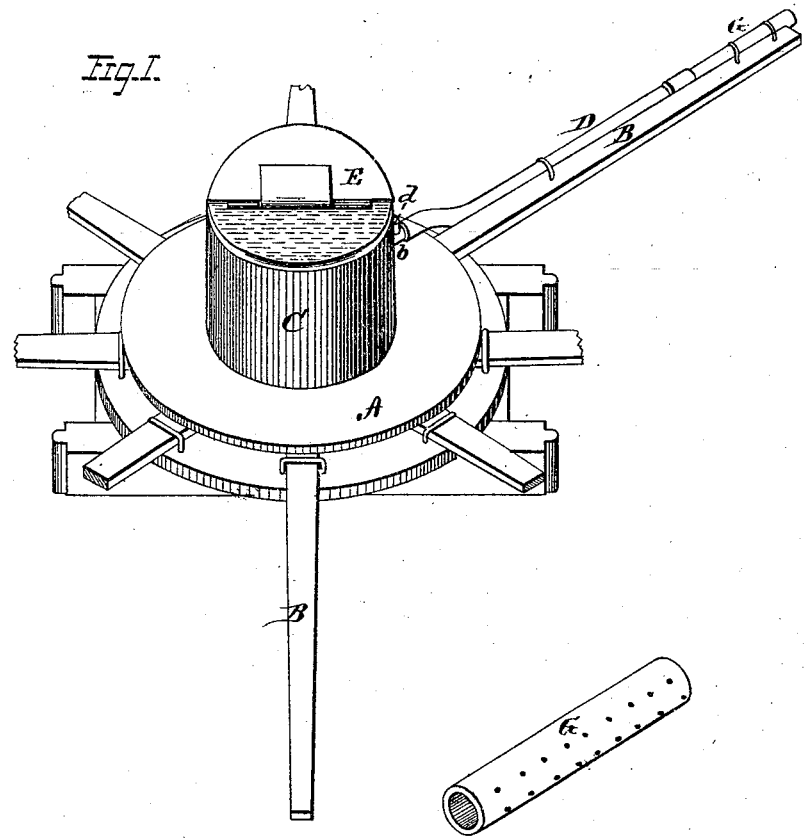
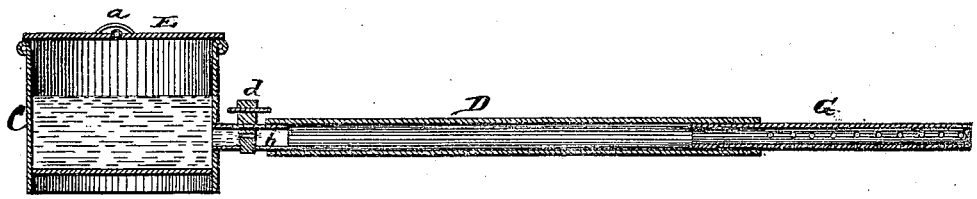
Witness:
Jas. E. Hutchinson
C. L. Evert.
Inventor.
Whitman Brown,
per
Alexander & Mason
Attorneys.

UNITED STATES PATENT OFFICE.

WHITMAN BROWN, OF OSHKOSH, WISCONSIN.

IMPROVEMENT IN TRACK-SPRINKLERS FOR HORSE POWERS.

Specification forming part of Letters Patent No. 132,797, dated November 5, 1872.

*To all whom it may concern:*

Be it known that I, WHITMAN BROWN, of Oshkosh, in the county of Winnebago and in the State of Wisconsin, have invented certain new and useful Improvements in Track-Sprinkling Attachment for Horse-Powers; and do hereby declare that the following is a full, clear, and exact description thereof, reference being had to the accompanying drawing and to the letters of reference marked thereon making a part of this specification.

The nature of my invention consists in a device for watering and sprinkling the track of sweeps or rotary-motion powers, or any kind of machines used to drive machinery where the motive power is produced by the means of one or more animals attached thereto and moving around in a circle. The object of my invention is to prevent the rising of dust in the air caused by the animals moving on the ground, and to lay what dust may be produced thereby, entirely removing and preventing this great nuisance to both man and beast. It is also beneficial in cooling the air, and thereby rendering it more endurable, cooling, and refreshing to both man and beast employed about such motive powers.

In order to enable others skilled in the art to which my invention appertains to make and use the same, I will now proceed to describe its construction and operation, referring to the annexed drawing, in which—

Figure 1 is a perspective view of a horse-power with a sprinkling device attached thereto; and Fig. 2 is a vertical section of the sprinkling apparatus.

A represents a rotary-motion power, to be operated by one or more animals attached to one or more of the sweeps B B. C represents a water-tank, of any suitable dimensions, and made of any desired material, with a cover, E, to prevent the water from splashing out, and with handles *a a* for convenience in handling the same. At or near the bottom of the tank C is a short outlet-pipe, *b*, provided with a faucet, *d*, and on the outer end of said pipe is attached a flexible or other pipe, D, leading to a tube, G, which is closed at its outer end, and provided with a number of small perforations, as shown in the drawing. The perforated sprinkling-tube G should be as long as the width of the track to be sprinkled. The tank C is placed upon the power A, and the tubes D and G attached to one of the arms or sweeps B in any suitable manner and by any suitable means. Then, when the faucet *d* is turned, the natural gravity and force of the water cause it to flow out through the perforated sprinkler and fall in small sprays or streams upon the ground. The tank and sprinkler move around continually with the power while in motion.

I do not desire to confine myself to the exact construction of the parts, as herein shown and described, as they may be varied or changed in numerous ways without departing from the spirit of my invention, which is the attachment of a sprinkling device or apparatus to a rotary-motion power.

Having thus fully described my invention, what I claim as new, and desire to secure by Letters Patent, is—

In combination with a rotary-motion power operated by one or more animals, an apparatus for sprinkling the track of the animal, substantially as and for the purposes herein set forth.

In testimony that I claim the foregoing I have hereunto set my hand this 11th day of October, 1872.

WHITMAN BROWN.

Witnesses:
P. C. PETERSON,
EDGAR BROWN.